United States Patent Office 3,480,624
Patented Nov. 25, 1969

3,480,624
DIBENZOCYCLOHEPTATRIENE DERIVATIVES
Jean Clement Louis Fouche, Bourg-la-Reine, France, assignor to Phone-Poulenc S.A., Paris, France, a French body corporate
No Drawing. Filed May 28, 1965, Ser. No. 459,921
Claims priority, application France, June 1, 1964, 976,650; Oct. 29, 1964, 993,217; Apr. 22, 1965, 14,253
Int. Cl. C07d 87/26, 29/28
U.S. Cl. 260—240                       7 Claims

ABSTRACT OF THE DISCLOSURE

New 10-aminoalkyldibenzocycloheptatriene derivatives and their salts have useful pharmacodynamic properties and have, inter alia, antidepressant, tranquillising, neuroleptic, analgesic, antiemetic, antihistaminic, spasmolytic, coronary dilating, and anticonvulsive properties.

---

This invention relates to dibenzocycloheptatriene derivatives and their preparation.

The invention provides, as new compounds, the dibenzo[a,d]cycloheptatriene derivatives of the formula:

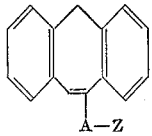

A—Z        (I)

and their acid addition salts and quaternary ammonium derivatives, in which A is a straight or branched, saturated divalent aliphatic hydrocarbon chain of 1 to 5 carbon atoms, and Z is amino, alklylamino, dialkylamino, phenylalkylamino, pyrrolidino, morpholino, or a radical of formula:

or

in which R is hydrogen, alkyl, alkenyl, alkynyl, hydroxyalkyl, phenyl, phenylalkyl, phenylalkenyl, carbamolyalkyl, N-alkylcarbamoylalkyl, N,N - dialkylcarbamoylalkyl, N-phenylcarbamoylalkyl, N-phenyl - N-alkylcarbamoylalkyl, or N,N-diphenylcarbamoylalkyl, and R' and R" are the same or different and each represents hydrogen, hydroxy, alkyl, alkoxy, alkoxycarbonyl, amino, alkylamino, dialkylamino, alkanoylamino, N-alkylalkanoylamino, N-phenylalkanoylamino, or phenyl, R" being neither hydroxy nor alkoxy when R' is hydroxy, amino, alkylamino, dialkylamino, alkanoylamino, N-alkylalkanoylamino, or N-phenylalkanoylamino, the aforesaid phenyl groups being optionally substituted by one or more halogen atoms, or alkyl, alkoxy, nitro, cyano, amino, or tirfluoromethyl groups, and each of the aforesaid alkyl, alkoxy, alkenyl, and alkanoyl radicals containing a maximum of 5 carbon atoms, Especially valuable compounds of Formula I are those in which A is —CH$_2$—, —(CH$_2$)$_2$—, —(CH$_2$)$_3$—, —CH(CH$_3$)CH$_2$—, —CH$_2$CH(CH$_3$)—, or

—CH$_2$CH(CH$_3$)CH$_2$— and Z is alkylamino, phenylalkylamino, dialkylamino, or a radical of formula:

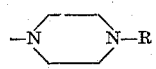

or

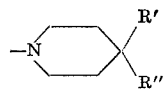

in which R is hydrogen, alkyl, hydroxyalkyl, phenylalkenyl, or 2,6-dimethylanilinocarbonylmethyl, R' is phenyl, or N-propionylanilino, and R" is hydrogen, hydroxy, or alkoxycarbonyl, each of the aforesaid alkyl, alkoxy and alkenyl groups containing a maximum of 5 carbon atoms, According to a feature of the invention, the compounds of Formula I are prepared by reacting a dibenzo[a,d]cycloheptatriene of the formula:

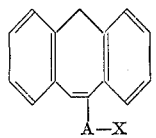

                    II with an amine of formula:

H—Z where X represents a reactive ester residue, such as a halogen atom or a sulphuric or sulphonic ester residue, for example of methoxysulphonyloxy radical, methanesulphonyloxy radical or p-toluenesulphonyloxy radical, and A and Z are as hereinbefore defined, and, if desired, converting a base obtained into an acid addition salt or quaternary ammonium derivative thereof, The reaction is preferably carried out in an inert organic diluent, such as an aromatic hydrocarbon (e.g., benzene or xylene) or an alcohol (e.g., ethanol). It is particularly advantageous to work at the boiling temperature of the diluent in the presence of an acid-binding agent, especially an excess of the amine of formula H—Z.

According to a further feature of the invention, the compounds of Formula I in which A is a radical of formula —B—CH$_2$—, where B represents a single bond or a straight or branched, saturated, divalent, aliphatic hydrocarbon chain of 1 to 4 carbon atoms, are prepared by reducing, by any process capable of reducing a carbonyl group to a methylene group without reducing an ethylenic double bond, a dibenzo[a,d]cycloheptatriene of the formula:

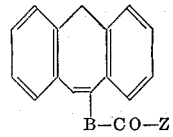

B—CO—Z                    III where B and Z are as hereinbefore defined and, if desired, converting a base defined into an acid addition salt or quaternary ammonium derivative thereof.

Preferably, this reduction is effected with lithium aluminum hydride, working in an anhydrous organic diluent such as an aliphatic ether (e.g., diethyl ether or diisopropyl ether) or a mononuclear cyclic ether with 5 or 6 ring atoms, such as tetrahydrofuran and tetrahydropyran. The reduction may be effected at a temperature between ambient temperature (for example 20° C.) and the boiling point of the solvent.

According to a still further feature of the invention, the compounds of Formula I in which Z is a radical of the formula:

in which R''' is alkyl, alkenyl, alkynyl, hydroxyalkyl, phenylalkyl, phenylalkenyl, carbamoylalkyl, N-alkylcarbamoylalkyl, N,N-dialkylcarbamoylalkyl, N-phenylcarbamoylalkyl, N-phenyl-N-alkylcarbamoylalkyl, or N, N-diphenylcarbamoylalkyl (the aforesaid phenyl, alkyl, alkoxy, alkenyl, and alkynyl radicals being as defined above) are prepared by reacting a piperazinoalkyldibenzo[a,d]cycloheptatriene of the formula:

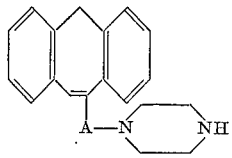

with a reactive ester of formula:

where X, A, and R''' are as defined above, and, if desired, converting a base obtained into an acid addition salt or quaternary ammonium derivative thereof.

It is advantageous to carry out the reaction in an inert organic solvent, such as ethanol or dimethylformamide, preferably at the boiling point, and to use an acid-binding agent, which may be an excess of the amine of Formula IV or an alkali metal derivative such as sodium bicarbonate.

The compounds of Formula I may optionally be purified by physical methods (such as distillation, crystallisation, and chromatography) or chemical methods, such as formation of salts, crystallisation of the latter, followed by decomposition of them in an alkaline medium. In these operations, the nature of the anion of the salt is immaterial, the only necessary conditions being that the salt is well-defined and can be easily crystallised.

The compounds of Formula I and their acid addition salts and quaternary ammonium derivatives, have interesting pharmacodynamic properties. They are active on the central nervous system, having antidepressant, tranquillising, neuroleptic, analgesic and antimetic effects. They also have a good antihistaminic activity and spasmolytic, coronary-dilating and anticonculsive properties.

Of the new compounds, the following bases may be mentioned as being of particular interest: 10-(3-dimethylaminopropyl)dibenzo[a,d]cycloheptatriene; 10 - (2-dimethylaminopropyl)dibenzo[a,d]cycloheptatriene; 10-(3-dimethylamino - 2 - methylpropyl)dibenzo[a,d]cycloheptatriene; 10 - (3 - methylaminopropyl)dibenzo[a,d] cycloheptatriene; 10-(3 - methylamino - 2 - methylpropyl) dibenzo[a,d]cycloheptatriene; 10 - [2-(4 - cinnamyl-1-piperazinyl)ethyl]dibenzo[a,d]cycloheptatriene; 10 - (4-cinnamyl - 1 - piperazinylmethyl)dibenzo[a,d]cycloheptatriene; and 10-[4-(2,6-dimethylanilinocarbonylmethyl)-1 - piperazinylmethyl]dibenzo[a,d]cycloheptatriene, and their acid addition salts and quanternary ammonium derivatives.

For therapeutic purposes, the new compounds may be used either as the bases, or as pharmaceutically acceptable acid addition salts or quaternary ammonium derivatives, i.e. salts and derivatives containing anions which are nontoxic in the doses used.

As examples of pharmaceutically acceptable acid addition salts, there may be mentioned the salts of mineral acids (such as the hydrochlorides, sulphates, nitrates, phosphates) and the salts of organic acids (such as the acetates, propionates, succinates, benzoates, fumarates, maleates, theophylline-acetates, salicylates, phenolphthalinates, and methylene bis-β-hydroxynaphthoates), as well as the substitution derivatives of these acids.

As examples of pharmaceutically acceptable quaternary ammonium salts, there may be mentioned derivatives containing anions of mineral or organic acids, such as the methochlorides, methobromides, methiodides, ethochlorides, ethobromides, ethiodides, allylchlorides, allylbromides, allyliodides, benzylchlorides, benzyl bromides, benzyl iodides, the methyl and ethyl sulphates, the benzenesulphonates, and the substitution derivatives of these compounds.

The acid addition salts can be obtained by the action of the bases of Formula I on acids in appropriate solvents. Suitable organic solvents include alcohols, ethers, ketones or chlorinated solvents. The salt which forms precipitates after optional concentration of its solution and may be separated by filtration or decantation.

The quaternary ammonium salts can be obtained by the action of the bases of Formula I on suitable reactive esters, optionally in an organic solvent, at normal temperature or more rapidly with gentle heating.

The following examples illustrate the invention.

EXAMPLE 1

Crude 10 - (3 - methanesulphonyloxypropyl)dibenzo [a,d]cycloheptatriene (the quantity obtained as described at the end of this example) is dissolved in 500 cc. of a solution of dimethylamine in benzene (containing 5.4 mols of dimethylamine per litre of solution). The solution is heated in an autoclave at 100° C. for 17 hours. After cooling, the reaction mixture is treated with 500 cc. of distilled water. The separated organic solution is washed with 500 cc. of distilled water and then extracted twice with a total of 800 cc. of 2 N aqueous methanesulphonic acid. The combined acid solutions are made alkaline with 160 cc. of 10 N sodium hydroxide solution and extracted twice with a total of 800 cc. of diethyl ether. The combined ethereal solutions are washed five times with a total of 2500 cc. of distilled water, dried over anhydrous potassium carbonate, and evaporated.

The oily residue (15.8 g.) is distilled under reduced pressure (0.01 mm. Hg). 13.4 g. of a middle fraction having a boiling point of 155–160° C./0.01 mm. Hg are obtained. This oily fraction is dissolved in 120 cc. of anhydrous acetone and treated with 13.2 cc. of anhydrous solution of hydrogen chloride in diethyl ether (containing 3.8 mols of hydrogen chloride per litre of solution). After cooling to 0° C. for two hours, the crystals which have appeared are separated, washed successively with 30 cc. of anhydrous acetone, 40 cc. of a mixture of equal volumes of anhydrous acetone and anhydrous diethyl ether, and then 40 cc. of anhydrous diethyl ether, and finally dried under reduced pressure. 13.1 g. of 10-(3 - dimethylaminopropyl)dibenzo[a,d]cycloheptatriene hydrochloride, melting at 215° C. to 216° C., are obtained.

The initial 10-(3-methanesulphonyloxypropyl)dibenzo [a,d]cycloheptatriene is prepared in the following manner:

A solution of 68.5 g. of 1-bromo-3-benzyloxypropane in 150 cc. of anhydrous diethyl ether is added in 45 minutes to a suspension of 7.3 g. of magnesium chips in 150 cc. of anhydrous diethyl ether, in the presence of a trace of iodine. Decolorisation occurs and the reaction keeps the ether refluxing. When the addition is complete, the reaction mixture is heated for 30 minutes under reflux. After cooling, a solution of 20.8 g. of 10-oxo-dibenzo [a,d]cycloheptadiene in 300 cc. of anhydrous diethyl ether is added in 5 minutes to the magnesium derivative solution thus prepared. The solution which is obtained is heated under reflux for 6 hours. After cooling to 25° C., 100 cc. of distilled water are carefully added, followed by a solution of 145 g. of ammonium chloride in 375 cc. of distilled water, and finally by 250 cc. of diethyl ether. The aqueous solution is separated and then washed with 300 cc. of diethyl ether. The combined ethereal solutions are washed six times with a total of 4200 cc. of distilled water until neutral, and then dried over anhydrous potassium carbonate and evaporated. The more volatile products are eliminated by heating to 170° C. under reduced pressure (0.1 mm. Hg) for 3 hours.

The oily residue obtained (42.5 g.) is dissolved in 670 cc. of a solution of anhydrous hydrogen chloride in anhydrous ethanol (containing approximately 5 mols of hydrogen chloride per litre of solution) and heated in an autoclave at 100° C. for 17 hours. After cooling and evaporating the solvent, the residue is treated with 300 cc. of distilled water and 300 cc. of diethyl ether. The aqueous solution is separated and again extracted with 200 cc. of diethyl ether. The combined ethereal solutions are washed twice with a total of 1000 cc. of distilled water until neutral, and then dried over anhydrous potassium carbonate and evaporated. The more volatile products are eliminated by heating to 120–130° C. under reduced pressure (0.1 mm. Hg) for 30 minutes.

The oily residue obtained (27.7 g.) is dissolved in 300 cc. of anhydrous pyridine and treated at —10° C. with 23.4 g. of methanesulphonyl chloride. The temperature is then kept for 2 hours at —10° C. The products of the reaction are poured into 1000 cc. of iced water and extracted twice with a total of 800 cc. of benzene. The combined benzene solutions are washed with 1000 cc. of iced water, then twice with a total of 2000 cc. of N hydrochloric acid, and finally twice with a total of 2000 cc. of iced water. The residual organic solution is dried over anhydrous magnesium sulphate and evaporated under reduced pressure (about 20 mm. Hg). Crude 10 - (3 - methanesulphonyloxypropyl)dibenzo[a,d]cycloheptatriene is thus obtained as an oil.

The initial 10-oxo-dibenzo[a,d]cycloheptadiene was prepared according to the method of Leonard et al., J. Amer. Chem. Soc. 77, 5081 (1955).

EXAMPLE 2

A solution of 17 g. of 10-dimethylaminocarbonylmethyldibenzo[a,d]cycloheptatriene in 250 cc. of anhydrous tetrahydrofuran is added in 15 minutes to a suspension of 5.15 g. of lithium-aluminum hydride in 90 cc. of anhydrous tetrahydrofuran. The reaction mixture is then heated under reflux for two hours. After cooling on an iced bath, the following are carefully added in succession: 4.6 cc. of distilled water; 3.55 cc. of 5 N aqueous sodium hydroxide solution; and 11.9 cc. of distilled water. The white suspension obtained is stirred for one hour at ambient temperature. The alumina is filtered off and washed with 300 cc. of methylene chloride. The combined filtrates are evaporated. The residue is taken up in 250 cc. of diethyl ether and 200 cc. of 2 N aqueous methanesulphonic acid. The separated ethereal layer is again extracted with 100 cc. of 2 N methanesulphonic acid. The combined aqueous acid solutions are washed with 150 cc. of diethyl ether and then made alkaline with 100 cc. of 10 N sodium hydroxide solution. The liberated oil is extracted three times with a total of 450 cc. of diethyl ether. The combined ethereal solutions are washed three times with a total of 600 cc. of distilled water, and then dried over anhydrous potassium carbonate and evaporated. The oily residue obtained (12.9 g.) is dissolved in 50 cc. of anhydrous acetone and treated with 14.8 cc. of a solution of anhydrous hydrogen chloride in anhydrous diethyl ether (containing 3.65 mols of hydrogen chloride per litre of solution). After cooling for 5 hours to 3° C., the crystals which have appeared are separated, washed successively with 15 cc. of anhydrous acetone, 20 cc. of a mixture of equal volumes of anhydrous acetone and anhydrous diethyl ether, and then twice with a total of 50 cc. of anhydrous diethyl ether, and finally dried under reduced pressure. 14.0 g. of 10-(2-dimethylaminoethyl)dibenzo[a,d]cycloheptatriene hydrochloride, M.P. 232–234° C., are thus obtained.

The initial 10 - dimethylaminocarbonylmethyl-dibenzo[a,d]cycloheptatriene, M.P. 134–136° C., is obtained by the action of carbonyldiimidazole on 10-carboxymethyl-dibenzo[a,d]cycloheptatriene in anhydrous tetrahydrofuran, followed by the addition of a solution of dimethylamine in benzene to the 10-imidazocarbonylmethyl-dibenzo[a,d]cycloheptatriene thus prepared.

The 10 - carboxymethyl-dibenzo[a,d]cycloheptatriene, M.P. 186–188° C., is obtained by the action of 2 N aqueous hydrochloric acid on a solution of crude 10-hydroxy-10-ethoxycarbonylmethyldibenzo[a,d]cycloheptadiene in dioxane, with refluxing for 7 hours.

The crude 10-hydroxy10-ethoxycarbonylmethyldibenzo [a,d]cycloheptadiene is obtained by the action of ethyl bromoacetate on 10-oxo-dibenzo[a,d]cycloheptadiene in the presence of zinc in a mixture of equal volumes of anhydrous benzene and toluene under reflux for one hour.

12.9 g. of 10-(1-dimethylaminocarbonylethyl)dibenzo-[a,d]cycloheptatriene in solution in 140 cc. of anhydrous tetrahydrofuran are added in 10 minutes to 3.8 g. of lithium aluminum hydride in 80 cc. of anhydrous tetrahydrofuran. The temperature rises from 30° C. to 51° C. The reaction mixture is then heated under reflux for two hours. After cooling with an ice bath, the following are carefully added in succession: 3.4 cc. of distilled water; 2.6 cc. of 5 N aqueous sodium hydroxide solution; and 8.8 cc. of distilled water. When the lithium aluminum hydride has been hydrolysed, the alumina is filtered off, and washed with 100 cc. of methylene chloride. The combined filtrates are evaporated. The residue is taken up in 250 cc. of diethyl ether, 200 cc. of distilled water and 10 cc. of 10 N sodium hydroxide solution. The separated ethereal solution is extracted twice with a total of 300 cc. of 2 N aqueous methanesulphonic acid. The combined acid solutions are washed with 150 cc. of diethyl ether and then made alkaline with 80 cc. of 10 N sodium hydroxide solution. The oil which separates out is extracted twice with a total of 400 cc. of diethyl ether. The combined ethereal solutions are washed until neutral with distilled water (using a total of 800 cc. in two operations), dried over anhydrous potassium carbonate, and evaporated. The oily residue (10.3 g.) is dissolved in 30 cc. of anhydrous acetone, and then treated with 12.0 cc. of an anhydrous ethereal solution of hydrogen chloride (containing 3.4 mols of hydrogen chloride per litre of solution). After cooling for 4 hours at 3° C., the crystals which appear are separated washed twice with a total of 24 cc. of ice-cold anhydrous acetone, and dried under reduced pressure. 10.5 g. of 10-(2-dimethylamino-1-methylethyl)dibenzo-[a,d]cycloheptatriene hydrochloride, M.P. about 215–220° C. with decomposition, are obtained.

The initial 10-(1-dimethylaminocarbonylethyl)dibenzo-[a,d]cycloheptatriene (an unpurified crude oil) is obtained by the action of dimethylamine on 1-imidazolocarbonylethyl-dibenzo[a,d]cycloheptatriene in solution in anhydrous tetrahydrofuran, itself prepared by the action of carbonyl-diimidazole on 10 - (1-carboxyethyl)dibenzo-[a,d]cycloheptatriene.

The 10 - (1-carboxyethyl)dibenzo[a,d]cycloheptatriene, M.P. 197–199° C., is obtained by hydrolysis of its ethyl ester with aqueous hydrochloric acid in dioxane, with heating under reflux for seven hours. The crude ethyl ester is obtained by the action of ethyl 2-bromopropionate on 10-oxo-dibenzo[a,d]cycloheptadiene in the presence of zinc in a mixture of equal volumes of anhydrous benzene and toluene.

EXAMPLE 4

8.55 g. of methanesulphonyl chloride are added in 5 minutes to 9.3 g. of 10-(2-hydroxypropyl)dibenzo[a,d] cycloheptatriene in solution in 140 cc. of anhydrous pyridine cooled to —10° C. The reaction temperature is maintained for a further hour at —10° C. and for two hours at 0° C. It is then treated with 600 cc. of distilled water while the internal temperature is kept at 5° C. The oil which separates out is extracted twice with a total of 600 cc. of benzene. The combined benzene solutions are extracted twice with 1600 cc. of ice-cold N aqueous hydrochloric acid and then washed until neutral with ice-cold distilled water (a total of 900 cc. in two operations). After drying over anhydrous magnesium sulphate, the solution in benzene which is obtained is concentrated under reduced pressure to a volume of 100 cc. and treated in an autoclave at 100° C. for 15 hours with 120 cc. of a solution of dimethylamine in benzene (containing 6.4 mols of dimethylamine per litre of solution). After cooling, the reaction produce is treated with 250 cc. of diethyl ether and 250 cc. of distilled water. The separated organic solution is washed with 250 cc. of distilled water and then extracted twice with a total of 500 cc. of 2 N aqueous methanesulphonic acid. The combined acid solutions are washed with 150 cc. of diethyl ether and made alkaline with 120 cc. of 10 N sodium hydroxide solution. The oil which separates out is extracted twice with a total of 500 cc. of diethyl ether. The combined ethereal solutions are washed until neutral with distilled water (a total of 900 cc. in three operations), dried over anhydrous potassium carbonate and evaporated. The oily residue (7.3 g.) is dissolved in 20 cc. of isopropanol and treated with 8.5 cc. of an anhydrous ethereal solution of hydrogen chloride (containing 3.4 mols of hydrogen chloride per litre of solution) and then with 12 cc. of anhydrous diethyl ether. After cooling for 2 days at 3° C., the crystals obtained are separated, washed with 20 cc. of a mixture of equal volumes of anhydrous isopropanol and anhydrous diethyl ether, and then with 10 cc. of anhydrous diethyl ether. After drying under reduced pressure, 7.1 g. of 10-(2-dimethylaminopropyl)dibenzo[a,d]cycloheptatriene hydrochloride, M.P. 190–192° C. with decomposition, are obtained.

The initial 10-(2-hydroxypropyl)dibenzo[a,d]cycloheptatriene, M.P. 88–90° C., is obtained by hydrogenation at normal pressure and temperature of 10-acetonyl-dibenzo[a,d]cycloheptatriene, in methanol in the presence of Adams' platinum. 10-acetonyl-dibenzo[a,d]cycloheptatriene, M.P. 110° C., is obtained by the action of cadmium dimethyl on 10-chlorocarbonylmethyl-dibenzo[a,d]cycloheptatriene, in benzene under reflux. 10-chlorocarbonylmethyl-dibenzo[a,d]cycloheptatriene, M.P. 113–115° C., is obtained by the action of thionyl chloride on 10-carboxymethyl-dibenzo[a,d]cycloheptatriene in benzene.

EXAMPLE 5

Crude 10 - (3 - methanesulphonyloxypropyl)dibenzo[a,d]-cycloheptatriene (the quantity obtained from 20.8 g. of 10-oxo-dibenzo[a,d]cycloheptadiene by the procedure described in Example I) is dissolved in 600 cc. of a solution of monomethylamine in benzene (containing 3 mols of methylamine per litre of solution). The resulting solution is heated in an autoclave at 100° C. for 17 hours. After cooling, the reaction mixture is washed twice with a total of 1000 cc. of distilled water, and then extracted twice with a total of 800 cc. of 2 N aqueous methanesulphonic acid. The combined acid solutions are washed with 200 cc. of diethyl ether and then made alkaline with 200 cc. of 10 N sodium hydroxide solution and extracted twice with a total of 800 cc. of diethyl ether. The combined ethereal solutions are washed three times with a total of 1500 cc. of distilled water, dried over anhydrous potassium carbonate, and evaporated.

The oily residue obtained (12.1 g.), dissolved in 60 cc. of anhydrous acetone, is treated with 14.1 cc. of an anhydrous solution of hydrogen chloride in diethyl ether (containing 3.6 mols of hydrogen chloride per litre of solution). After cooling for 17 hours to 3° C., the crystals formed are separated, washed successively with 35 cc. of anhydrous acetone, 25 cc. of a mixture of equal volumes of anhydrous acetone and anhydrous diethyl ether, and then 30 cc. of anhydrous diethyl ether, and finally dried under reduced pressure (20 mm. Hg). 8.8 g. of 10-(3-methylaminopropyl)dibenzo[a,d]cycloheptatriene hydrochloride, M.P. 160–162° C, are obtained.

EXAMPLE 6

Crude 10 - (3 - methanesulphonyloxypropyl)dibenzo[a,d]cycloheptatriene (the quantity obtained from 10.4 g. of 10-oxo-dibenzo[a,d]cycloheptadiene), dissolved in 180 cc. of anhydrous toluene, is heated to 100° C. in the presence of 20 g. of 1-methylpiperazine for 15 hours. After cooling, the reaction mixture is treated with 150 cc. of distilled water and 10 cc. of 2 N sodium hydroxide solution. The aqueous solution is separated and washed with 150 cc. of diethyl ether. The combined organic phases are extracted twice with a total of 200 cc. of 2 N aqueous methanesulphonic acid. The combined acid solutions are washed with 150 cc. of diethyl ether and then made alkaline with 50 cc. of 10 N sodium hydroxide solution. The oil which separates out is extracted twice with a total of 400 cc. of diethyl ether. The combined ethereal solutions are washed five times with a total of 2500 cc. of distilled water, dried over anhydrous potassium carbonate, and evaporated. The oily residue obtained (9 g.) is distilled under reduced pressure (0.15 mm. Hg). The middle fraction (6.7 g.), passing over between 197 and 201° C., dissolved in 25 cc. of anhydrous ethanol, is treated with 8.8 cc. of an anhydrous solution of hydrogen chloride in ethanol (containing 4.6 mols of hydrogen chloride per litre of solution). After cooling for 17 hours at 3° C., the crystals formed are separated, washed three times with a total of 30 cc. of ice-cold anhydrous ethanol, and dried under reduced pressure (20 mm. Hg). 7.7 g. of 10-[3-(4-methyl - 1 - piperazinyl)propyl]dibenzo[a,d]cycloheptatriene dihydrochloride, M.P. 245–250° C., are obtained.

EXAMPLE 7

Crude 10 - (3 - methanesulphonyloxypropyl)dibenzo[a,d]cycloheptatriene (the quantity obtained from 10.4 g. of 10 - oxo - dibenzo[a,d]cycloheptadiene) dissolved in 190 cc. of anhydrous toluene, is heated to 100° C. for 10 hours in the presence of 26 g. of 1-hydroxyethyl-piperazine. After cooling, the reaction mixture is treated with 150 cc. of distilled water and 10 cc. of 2 N sodium hydroxide solution. The aqueous solution is separated and washed with 150 cc. of diethyl ether. The combined organic phases are extracted twice with a total of 200 cc. of 2 N aqueous methanesulphonic acid. The combined acid solutions are washed with 150 cc. of diethyl ether and then made alkaline with 50 cc. of 10 N sodium hydroxide solution. The oil which separates out is extracted twice with a total of 400 cc. of diethyl ether. The combined ethereal solutions are washed four times with a total of 2000 cc. of distilled water, dried over anhydrous potassium carbonate, and evaporated. The oily residue obtained (6.7 g.), dissolved in 30 cc. of anhydrous ethanol, is treated with 7.7 cc. of an anhydrous solution of hydrogen chloride in ethanol (containing 4.6 mols of hydrogen chloride per litre of solution). After cooling for three hours at 3° C., the crystals formed are separated, washed twice with a total of 20 cc. of ice-cold anhydrous ethanol, and dried under reduced pressure (20 mm. Hg). After drying, the product is hydrated in moist air. After stabilisation of the hydrate, 7.9 g. of 10 - [3 - (4 - 2' - hydroxyethyl - 1 - piperazinyl)propyl]dibenzo[a,d]cycloheptatriene dihydrochloride, with 2 molecules of water of crystallization, M.P. about 190° C., are obtained.

EXAMPLE 8

Crude 10 - (3 - methanesulphonyloxy - 2 - methylpropyl)dibenzo[a,d]cycloheptatriene (prepared from 14 g. of 10 - oxo - dibenzo[a,d]cycloheptadiene, in the same manner as 10 - (3 - methanesulphonyloxypropyl)dibenzo[a,d]cycloheptatriene, but replacing the 3-benzyloxypropyl magnesiumbromide by 3 - benzyloxy - 2 - methylpropyl magnesium bromide) is dissolved in 400 cc. of a solution of dimethylamine in benzene (containing 3.4 mols of dimethylamine per litre of solution). The solution formed is heated in an autoclave at 100° C. for 15 hours. After cooling, 500 cc. of water and 150 cc. of diethyl ether are added to the reaction mixture. The organic phase is separated, washed twice with a total of 1000 cc. of distilled water, and extracted three times with a total of 400 cc. of 2 N aqueous methanesulphonic acid. The combined acid solutions are washed with 100 cc. of diethyl ether and made alkaline with 100 cc. of 10 N sodium hydroxide solution. The oil which separates out is extracted twice with a total of 500 cc. of diethyl ether. The combined ethereal solutions are washed three times with a total of 1500 cc. of distilled water, dried over anhydrous potassium carbonate, and evaporated. The oily residue obtained (9.6 g.) is distilled under reduced pressure (0.02 mm. Hg). The middle fraction (6.8 g.), distilling over between 155 and 165° C., dissolved in 25 cc. of anhydrous acetone, is treated with 7 cc. of an anhydrous solution of hydrogen chloride in diethyl ether (containing 3.4 mols of hydrogen chloride per litre of solution). After cooling for 17 hours to 3° C., the crystals formed are separated, washed twice with a total of 25 cc. of ice-cold anhydrous acetone, and dried under reduced pressure (20 mm. Hg). 6 g. of 10 - (3 - dimethylamino - 2 - methylpropyl)dibenzo[a,d]cycloheptatriene hydrochloride, M.P. 214–216° C., are obtained.

EXAMPLE 9

Crude 10 - (3-methanesulphonyloxy-2-methylpropyl)dibenzo[a,d]cycloheptatriene (obtained from 20.8 g. of 10-oxo-dibenzo[a,d]cycloheptadiene) is dissolved in 600 cc. of a solution of monomethylamine in benzene (containing 2.7 mols of methylamine per litre of solution). The solution formed is heated in an autoclave at 100° C. for 11 hours. After cooling, the reaction mixture is treated with 500 cc. of water. The organic solution is separated, washed with 500 cc. of distilled water, and extracted three times with a total of 800 cc. of 2 N aqueous methanesulphonic acid. The combined acid phases are washed with 250 cc. of diethyl ether and made alkaline with 200 cc. of 10 N sodium hydroxide solution. The oil which separates is extracted three times with a total of 750 cc. of diethyl ether. The combined ethereal solutions are washed four times with 2000 cc. of distilled water, dried over anhydrous potassium carbonate, and evaporated. The oily residue (15.5 g.) is distilled under reduced pressure (0.1 mm. Hg). The middle fraction (11 g.), distilling between 154 and 174° C., dissolved in 35 cc. of anhydrous acetone, is treated with 10.6 cc. of an anhydrous solution of hydrogen chloride in diethyl ether (containing 4.15 mols of hydrogen chloride per litre of solution). After cooling for 4 hours at 3° C., the crystals formed are separated, washed twice with a total of 50 cc. of ice-cold anhydrous acetone, and dried under reduced pressure (20 mm. Hg). 11.2 g. of 10-(3-methylamino-2-methylpropyl)dibenzo[a,d]cycloheptatriene hydrochloride, M.P. 194–196° C., are obtained.

EXAMPLE 10

A solution of 12 g. of 10-(4-methyl-1-piperazinylcarbonylmethyl)dibenzo[a,d]cycloheptatriene in 280 cc. of anhydrous diethyl ether is added in 25 minutes to a suspension of 3 g. of lithium aluminium hydride in 100 cc. of anhydrous diethyl ether. The reaction mixture is then heated under reflux for two hours. After cooling in an ice bath, 3.5 cc. of distilled water, 2.6 cc. of 5 N aqueous sodium hydroxide solution, and 11.7 cc. of distilled water, are carefully added in succession. The white suspension obtained is stirred for 30 minutes at ambient temperature. The alumina is removed by filtration, and washed three times with a total of 150 cc. of diethyl ether, and then with 500 cc. of methylene chloride. The combined organic solutions are evaporated. The crystalline residue (11.8 g.) is taken up in 325 cc. of diethyl ether and 250 cc. of distilled water. The separated ethereal solution is extracted twice with a total of 400 cc. of 2 N aqueous methanesulphonic acid. The combined acid phases are washed with 250 cc. of diethyl ether and then made alkaline with 100 cc. of 10 N sodium hydroxide solution. The oil which separates out is extracted twice with a total of 500 cc. of diethyl ether. The combined ethereal solutions are dried over anhydrous potassium carbonate and evaporated. The residue (9.8 g.) is dissolved in 17 cc. of boiling diisopropyl ether. After cooling for 4 hours at 3° C., the crystals formed are separated, washed twice with a total of 17 cc. of ice-cold diisopropyl ether, and dried under reduced pressure (20 mm. Hg). 6.1 g. of 10-[2-(4-methyl-1 - piperazinyl)ethyl]dibenzo[a,d]cycloheptatriene, M.P. 85–86° C., are obtained.

The initial 10-(4-methyl-1-piperazinyl-carbonylmethyl)dibenzo-[a,d]cycloheptatriene, M.P. 180° C., is obtained by the action of carbonyldiimidazole on 10-carboxymethyldibenzo[a,d]cycloheptatriene in anhydrous tetrahydrofuran, followed by the addition of 1-methyl-piperazine to the 10-imidazolocarbonylmethyl-dibenzo[a,d]cycloheptatriene thus prepared.

EXAMPLE 11

A solution of 11.7 g. of 10-(4-cinnamyl-1-piperazinylcarbonylmethyl)dibenzo[a,d]cycloheptatriene in 250 cc. of anhydrous diethyl ether is added in 15 minutes to a suspension of 2.3 g. of lithium aluminium hydride in 100 cc. of anhydrous diethyl ether. The reaction mixture is then heated under reflux for two hours. After cooling in an ice bath, 3.15 cc. of distilled water, 2.4 cc. of 5 N aqueous sodium hydroxide solution and 11 cc. of distilled water are carefully added in succession. The white suspension obtained is stirred for 30 minutes at ambient temperature. The alumina is separated by filtration and washed twice with a total of 550 cc. of methylene chloride. The combined organic solutions are dried over anhydrous sodium sulphate and evaporated. The oily residue obtained is dissolved in 800 cc. of methylene chloride and extracted twice with a total of 500 cc. of 2 N sulphuric acid. The oil which separates 10-[2-(4-cinnamyl-1-piperazinyl)ethyl]dibenzo[a,d]cycloheptatriene sulphate (which is sparingly soluble in sulphuric acid), and the acid solutions are combined and made alkaline with 120 cc. of 10 N sodium hydroxide solution. The oil which separates is extracted three times with a total of 900 cc. of methylene chloride. The combined methylene chloride solutions are washed twice with a total of 1000 cc. of distilled water, dried over anhydrous potassium carbonate, and evaporated. The oily residue (9.5 g.), dissolved in 25 cc. of anhydrous ethanol, is poured into 25 cc. of a solution of methanesulphonic acid in ethanol (containing 2 mols of methanesulphonic acid per litre of solution). After cooling for 17 hours at 3° C., the crystals formed are separated, washed twice with a total of 40 cc. of ice-cold ethanol, and then dried under reduced pressure (0.1 mm. Hg) at 80° C. until the weight is constant. 11.5 g. of the bis-methanesulphonate of 10-[2-(4-cinnamyl-1-piperazinyl)ethyl]dibenzo[a,d]cycloheptatriene, M.P. 235° C., are obtained.

The initial crude, non-crystalline 10-(4-cinnamyl-1-piperazinyl-carbonylmethyl)dibenzo[a,d]cycloheptatriene is obtained by the action of 1-cinnamyl-piperazine in tetrahydrofuran on 10 - imidazolocarbonylmethyl-dibenzo[a,d]cycloheptatriene (itself obtained by the action of carbonyl-diimidazole on 10-carboxymethyl-dibenzo[a,d]cycloheptatriene).

EXAMPLE 12

10 - (2 - methanesulphonyloxyethyl)dibenzo[a,d]cycloheptatriene (prepared from 4.7 g. of 10 - (2 - hydroxyethyl)dibenzo[a,d]cycloheptatriene) dissolved in 150 cc. of benzene is added to 150 cc.. of a solution of dimethylamine in benzene (containing 5.4 mols. of dimethylamine per litre of solution). The solution prepared is heated in an autoclave at 100° C. for 17 hours. After cooling, the reaction mixture is treated with 100 cc. of distilled water. The separated aqueous solution is washed with 50 cc. of diethyl ether. The combined organic phases are extracted twice with a total of 150 cc. of N aqueous methanesulphonic acid. The combined acid solutions are washed with 50 cc. of diethyl ether and made alkaline with 25 cc. of 10 N sodium hydroxide solution. The oil which separates is extracted three times with a total of 150 cc. of diethyl ether. The combined ethereal solutions are dried over anhydrous sodium sulphate, and evaporated. 5 g. of crude 10-(2-dimethylaminoethyl)dibenzo[a,d]cycloheptatriene, M.P. 68° C., are obtained. After recrystallisation from diisopropyl ether, it melts at 70° C. The hydrochloride melts at 232°.

10 - (2 - methanesulphonyloxyethyl)dibenzo[a,d]cycloheptatriene is prepared by the action of methanesulphonyl chloride on 10 - (2 - hydroxyethyl)dibenzo[a,d]cycloheptatriene in anhydrous pyridine at −10° C. The crude product is used without purification.

10 - (2 - hydroxyethyl)dibenzo[a,d]cycloheptatriene, M.P. 126–127° C., is prepared by the reduction of 10-methoxycarbonylmethyl - dibenzo[a,d]cycloheptatriene with lithium aluminium hydride in anhydrous diethyl ether. 10 - methoxycarbonylmethyl - dibenzo[a,d]cycloheptatriene, M.P. 71° C., is obtained by the action of methanol on 10 - carboxymethyl - dibenzo[a,d]cycloheptatriene in the presence of sulphuric acid.

EXAMPLE 13

Crude 10 - (2 - methanesulphonyloxyethyl)dibenzo[a,d]cycloheptatriene (prepared from 4.7 g. of 10-(2-hydroxyethyl)dibenzo[a,d]cycloheptatriene), dissolved in 150 cc. of benzene is added to a suspension of 7.1 g. of 4-hydroxy-4-phenylpiperidine in 50 cc. of benzene, and the mixture is heated under reflux for 18 hours. After cooling to 20° C., the crystals formed are separated, and washed four times with a total of 100 cc. of diethyl ether. The combined filtrates are washed seven times with a total of 700 cc. of distilled water and treated with 50 cc. of N aqueous methanesulphonic acid. The crystals which appear are separated, washed four times with a total of 80 cc. of distilled water and then four times with a total of 80 cc. of diethyl ether. These crystals are then added to 100 cc. of 2 N sodium hydroxide solution in the presence of 50 cc. of methylene chloride. After stirring, two homogeneous liquid phases are obtained. The aqueous solution is separated, and washed three times with a total of 100 cc. of methylene chloride. The combined methylene chloride solutions are dried over anhydrous sodium sulphate and evaporated. The solid residue (5.5 g.), M.P. 148° C., is recrystallised from 60 cc. of boiling isopropanol. After cooling for 17 hours at 3° C., the crystals are separated, washed with 10 cc. of ice-cold isopropanol, and dried under reduced pressure (20 mm. Hg). 4.45 g. of 10-[2-(4-hydroxy-4-phenyl - 1 - piperidyl(ethyl]dibenzo[a,d]cycloheptatriene, M.P. 150° C., are obtained.

EXAMPLE 14

10 - (2 - methanesulphonyloxyethyl)dibenzo[a,d]cycloheptatriene (prepared from 4.7 g. of 10 - (2 - hydroxyethyl)dibenzo[a,d]cycloheptatriene), dissolved in 150 cc. of benzene, is added to a solution of 9.3 g. of 4-phenyl-4-ethoxycarbonylpiperidine in 100 cc. of benzene. The mixture is heated under reflux for 18 hours. After cooling, the reaction products are treated with 100 cc. of diethyl ether and 100 cc. of distilled water. The organic phase is separated, washed nine times with a total of 900 cc. of distilled water, and extracted twice with a total of 60 cc. of N aqueous methanesulphonic acid. The organic solution is then dried over anhydrous sodium sulphate and evaporated. The residue (10 g.) is dissolved with warming in 300 cc. of ethyl acetate. After cooling for 17 hours at 3°, the crystals formed are separated, washed with 30 cc. of ethyl acetate, and dried under reduced pressure. 5.5 g. of 10-[2-(4-phenyl-4-ethoxy-carbonyl - 1 - piperidyl)ethyl]dibenzo[a,d]cycloheptatriene methanesulphonate, M.P. 173–174° C., are obtained. By concentrating the filtrate, 1.6 g. of the same product are recovered. The two crystalline batches combined are treated with 250 cc. of chloroform and 300 cc. of 2 N sodium hydroxide solution. After stirring, two homogeneous liquid phases are obtained. The chloroform solution is washed with 100 cc. of distilled water, dried over anhydrous sodium sulphate, and evaporated. The residue (5.8 g.) is dissolved in 155 cc. of boiling diisopropyl ether. After cooling for 17 hours at 3° C., the crystals formed are separated, washed with 30 cc. of diisopropyl ether and dried under reduced pressure (20 mm. Hg). 4.3 g. of 10 - [2 - (4 - phenyl - 4 - ethoxycarbonyl - 1 - piperidyl)ethyl]dibenzo[a,d]cycloheptatriene, M.P. 130–131° C., are obtained.

EXAMPLE 15

A suspension of 3.65 g. of lithium aluminium hydride in 320 cc. of anhydrous diethyl ether has added thereto, in small portions and over 5 minutes, 8.4 g. of 10-dimethylaminocarbonyl-dibenzo[a,d]cycloheptatriene. The reaction mixture is then heated under reflux for 2 hours. After cooling on an ice bath, 4.3 cc. of distilled water, 3.15 cc. of 5 N aqueous sodium hydroxide, and 14.2 cc. of distilled water, are carefully added in succession. The white suspension obtained is stirred for one hour at ambient temperature. The alumina is separated by filtration and washed six times with a total of 300 cc. of methylene chloride. The combined organic filtrates are extracted three times with a total of 300 cc. of 2 N aqueous methanesulphonic acid. The combined acid solutions are washed with 75 cc. of diethyl ether and made alkaline with 80 cc. of 10 N sodium hydroxide solution. The oil which separates is extracted three times with a total of 300 cc. of methylene chloride. The combined solutions in methylene chloride are washed three times with 180 cc. of distilled water, dried over anhydrous sodium sulphate, and evaporated. The white crystalline residue (7.4 g.) is dissolved in 30 cc. of boiling acetonitrile. After cooling for two hours at 3° C., the crystals formed are separated, washed three times with a total of 12 cc. of ice-cold acetonitrile, and dried under reduced pressure (20 mm. Hg). 6.6 g. of 10-dimethylaminomethyl - dibenzo[a,d]cycloheptatriene, M.P. 127–129° C., are obtained.

The initial 10 - dimethylaminocarbonyl - dibenzo[a,d]cycloheptatriene, M.P. 169–171° C., is obtained by the action of 10 - chlorocarbonyl - dibenzo[a,d]cycloheptatriene on a solution of dimethylamine in benzene.

Oily crude 10 - chlorocarbonyl - dibenzo[a,d]cycloheptatriene is obtained by the action of thionyl chloride on 10-carboxydibenzo[a,d]cycloheptatriene in benzene under reflux. 10 - carboxydibenzo[a,d]cycloheptatriene, M.P. 199–201° C., is obtained by the action of potassium hydroxide on 10 - cyanodibenzo[a,d]cycloheptatriene in isoamyl alcohol under reflux. The 10-cyanodibenzo[a,d]cycloheptatriene, M.P. 97–99° C., is obtained by the action of cuprous cyanide on 10-bromodibenzo[a,d]cycloheptatriene in pyridine under reflux. Crude, oily 10-bromodibenzo[a,d]cycloheptatriene is obtained by the action of potassium hydroxide on 10,11-dibromodibenzo [a,d]cycloheptadiene in solution in a mixture of ethanol and dioxane. The 10,11-dibromodibenzo[a,d] cycloheptadiene, M.P. 179–181°, can be prepared by the method of Treibs et al., Chem. Ber. 84, 679 (1951).

EXAMPLE 16

To a suspension of 1.5 g. of lithium aluminium hydride in 130 cc. of anhydrous diethyl ether is added, in small portions and over 5 minutes, 4.1 g. of 10 - (4 - methyl-1-piperazinyl - carbonyl)dibenzo[a,d]cycloheptatriene. The reaction mixture is then heated under reflux for 2 hours. After cooling in an ice bath, 1.7 cc. of distilled water, 1.25 cc. of 5 N aqueous sodium hydroxide, and 5.75 cc. of distilled water, are added carefully in succession. The white suspension obtained is stirred for two hours at ambient temperature. The alumina is separated by filtration and washed five times with a total of 150 cc. of methylene chloride. The combined organic filtrates are evaporated. The residue is taken up in 200 cc. of diethyl ether and extracted three times with a total of 100 cc. of 2 N aqueous methanesulphonic acid. The combined acid solutions are washed with 30 cc. of diethyl ether and made alkaline with 30 cc. of 10 N sodium hydroxide solution. The oil which separates out is extracted three times with a total of 350 cc. of diethyl ether. The combined ethereal solutions are washed three times with a total of 90 cc. of distilled water, dried over anhydrous potassium carbonate, and evaporated. The residue obtained (3.7 g.) is dissolved in 15 cc. of anhydrous ethanol, and treated with 5.8 cc. of an anhydrous solution of hydrogen chloride in ethanol (containing 4.3 mols of hydrogen chloride per litre of solution). After cooling for 4 hours at 3° C., the crystals formed are separated, washed twice with a total of 10 cc. of ice-cold ethanol and dried under reduced pressure (20 mm. Hg). 4.15 g. of 10-(4-methyl-1 - piperazinyl - methyl)dibenzo[a,d]cycloheptatriene dihydrochloride, M.P. about 250° C., are obtained.

The initial 10 - (4 - methyl-1-piperazinyl-carbonyl)-dibenzo[a,d]cycloheptatriene, M.P. 122–124° C., is prepared by the action of 10 - chlorocarbonyl - dibenzo[a,d]cycloheptatriene on 1-methyl-piperazine in benzene.

EXAMPLE 17

To a suspension of 3.05 g. of lithium aluminium hydride in 125 cc. of anhydrous diethyl ether is added, in 20 minutes, 11.2 g. of 10 - (4 - cinnamyl-1-piperazinyl-carbonyl)dibenzo[a,d]cycloheptatriene dissolved in 125 cc. of anhydrous diethyl ether. The reaction mixture is then heated for two hours under reflux. After cooling on an ice bath, 3.5 cc. of distilled water, 2.55 cc. of 5 N aqueous sodium hydroxide, and 11.9 cc. of distilled water, are carefully added in succession. The white suspension obtained is stirred for two hours at ambient temperature. The alumina is separated by filtration and washed five times with a total of 200 cc. of methylene chloride. The combined filtrates are evaporated. The residue is dissolved in 250 cc. of diethyl ether and extracted four times with a total of 350 cc. of 2 N aqueous acetic acid, and then with 150 cc. of 2 N aqueous methanesulphonic acid. The combined acid solutions are washed with 50 cc. of diethyl ether and made alkaline with 120 cc. of 10 N sodium hydroxide solution. The oil which separates out is extracted four times with a total of 350 cc. of diethyl ether. The combined ethereal solutions are washed four times with a total of 120 cc. of distilled water, dried over anhydrous potassium carbonate, and evaporated. The oily residue obtained (8.1 g.), dissolved in 20 cc. of anhydrous ethanol, is treated with 22 cc. of an anhydrous solution of methanesulphonic acid in ethanol (containing 2 mols of methanesulphonic acid per litre of solution), and then with 60 cc. of anhydrous diethyl ether. After standing for 17 hours at 20° C., the crystals formed are separated, washed four times with a total of 120 cc. of anhydrous ether, and dried under reduced pressure (20 mm. Hg). 11 g. of 10-(4-cinnamyl - 1 - piperazinyl-methyl)-dibenzo[a,d]cycloheptatriene bis-methanesulphonate, M.P. 236–240° C. are obtained.

The initial crude 10 - (4 - cinnamyl-1-piperazinylcarbonyl)dibenzo[a,d]cycloheptatriene is obtained by the action of 10 - chlorocarbonyl - dibenzo[a,d]cycloheptatriene on 1-cinnamyl-piperazine in benzene.

EXAMPLE 18

4 g. of 10 - chloromethyl-dibenzo[a,d]cycloheptatriene, 2.95 g. of 4 - hydroxy - 4 - phenyl-piperidine, and 2.2 g. of sodium bicarbonate are heated under reflux in 65 cc. of dimethylformamide for 5 hours. The cooled reaction mixture is poured into 650 cc. of distilled water and treated with 7.5 cc. of 10 N sodium hydroxide solution and 375 cc. of diethyl ether. The separated ethereal solution is washed five times with a total of 500 cc. of distilled water, dried over anhydrous potassium carbonate and evaporated. The oily residue (6.2 g.), dissolved in 15 cc. of anhydrous ethanol, is treated with 8.2 cc. of an anhydrous solution of methanesulphonic acid in ethanol (containing 2 mols of methanesulphonic acid per litre of solution). After cooling for 30 minutes at 5° C., the crystals formed are separated, washed twice with a total of 8 cc. of ice-cold ethanol, and dried under reduced pressure (20 mm. Hg). 7 g. of 10-(4-hydroxy-4-phenyl-1-piperidyl - methyl) - dibenzo[a,d]cycloheptatriene methanesulphonate, M.P. 258–262° C., are obtained.

The initial 10 - chloromethyl - dibenzo[a,d]cycloheptatriene, M.P. 74° C., is prepared by the action of thionyl chloride on 10 - hydroxymethyl - dibenzo[a,d]cycloheptatriene in solution in chloroform.

10 - hydroxymethyl - dibenzo[a,d]cycloheptatriene, M.P. 93° C., is prepared by reduction of 10-methoxycarbonyl - dibenzo[a,d]cycloheptatriene with lithium aluminium hydride in anhydrous diethyl ether. 10-methoxycarbonyl - dibenzo[a,d]cycloheptatriene, M.P. 86° C., is prepared by the action of methanol on 10-carboxy-dibenzo[a,d]cycloheptatriene in the presence of sulphuric acid.

EXAMPLE 19

2.4 g. of 10-chloromethyl-dibenzo[a,d]cycloheptatriene, 2.7 g. of 4-phenyl-4-ethoxycarbonyl-piperidine hydrochloride, and 2.5 g. of sodium bicarbonate are heated under reflux in 40 cc. of dimethylformamide for 6 hours. The cooled reaction mixture is poured into 350 cc. of water and treated with 25 cc. of 2 N aqueous hydroxide and 250 cc. of diethyl ether. The separated aqueous phase is extracted with 100 cc. of methylene chloride and then with 100 cc. of diethyl ether. The combined organic solutions are washed eight times with a total of 600 cc. of distilled water and then extracted three times with a total of 200 cc. of 2 N aqueous methanesulphonic acid. The combined acid solutions are washed with 50 cc. of diethyl ether.

The combined organic solutions are then washed twice with a total of 200 cc. of N aqueous sodium hydroxide, five times with a total of 250 cc. of distilled water, dried over anhydrous potassium carbonate, and evaporated. The oily residue (3.95 g.) is dissolved in 10 cc. of boiling acetonitrile. After cooling for 6 hours at 3° C., the crystals formed are separated, washed three times with a total of 4.5 cc. of ice-cold acetonitrile, and dried under reduced pressure (20 mm. Hg). 3.5 g. of 10-(4-phenyl-4-ethoxycarbonyl - 1 - piperidyl-methyl-dibenzo[a,d]cycloheptatriene, M.P. 133–135° C., are obtained.

EXAMPLE 20

2.05 g. of 10 - chloromethyl-dibenzo[a,d]cycloheptatriene, 1 g. of 1-formyl-piperazine, and 1.1 g. of sodium bicarbonate are heated under reflux in 35 cc. of dimethylformamide for 6 hours. The cooled reaction mixture is poured into 350 cc. of distilled water and treated with 25 cc. of 2 N aqueous sodium hydroxide solution and 200 cc. of diethyl ether. The separated aqueous phase is washed with 150 cc. of diethyl ether. The combined ethereal solutions are washed five times with a total of 250 cc. of distilled water, and extracted three times with a total of 180 cc. of 2 N aqueous methanesulphonic acid. The combined acid solutions are washed with 50 cc. of diethyl ether and then made alkaline with 50 cc. of 10 N sodium hydroxide solution. The oil which separates is extracted with 150 cc. of diethyl ether, 100 cc. of methylene chloride, and then 50 cc. of diethyl ether. The combined organic extracts are washed four times with a total of 100 cc. of distilled water, dried over anhydrous potassium carbonate, and evaporated. The residue obtained (2.45 g.) is treated with 40 cc. of 2 N aqueous methanesulphonic acid under reflux for two hours. After cooling, the reaction medium is diluted with 100 cc. of distilled water, filtered, and then made alkaline with 10 cc. of 10 N sodium hydroxide solution. The oil which separates is extracted three times with a total of 200 cc. of diethyl ether. The combined ethereal solutions are washed three times with a total of 75 cc. of distilled water, dried over anhydrous potassium carbonate, and evaporated. The oily residue obtained (1.8 g.), dissolved in 6 cc. of anhydrous ethanol, is treated with 2 cc. of an anhydrous solution of hydrogen chloride in ethanol (containing 6 mols of hydrogen chloride per litre of solution). After cooling for 4 hours to 3° C., the crystals formed are separated, washed twice with a total of 3 cc. of ice-cold ethanol, and dried under reduced pressure (20 mm. Hg). 1.9 g. of 10 - piperazinomethyl-dibenzo[a,d]cycloheptatriene dihydrochloride, M.P. about 255° C., are obtained.

EXAMPLE 21

4.15 g. of 2,6-dimethyl-chloroacetanilide, 6.1 g. of 10-piperazinomethyl-dibenzo[a,d]cycloheptatriene, and 3.5 g. of sodium bicarbonate are heated under reflux in 40 cc. of dimethylformamide for 5 hours. After cooling, the reaction mixture is poured into 350 cc. of distilled water, and treated with 10 cc. of 10 N sodium hydroxide solution and 300 cc. of diethyl ether. The separated aqueous phase is washed with 250 cc. of diethyl ether. The combined ethereal solutions are washed six times with a total of 600 cc. of distilled water and extracted three times with a total of 400 cc. of 2 N aqueous methanesulphonic acid. The combined acid solutions are washed with 100 cc. of diethyl ether and made alkaline with 100 cc. of 10 N sodium hydroxide solution. The oil which separates out is extracted three times with a toal of 450 cc. of methylene chloride. The combined methylene chloride solutions are washed three times with a total of 300 cc. of distilled water, dried over anhydrous potassium carbonate, and evaporated. The oily residue obtained (9.2 g.) is dissolved in 90 cc. of boiling ethanol. After cooling for 3 hours at 3° C., the crystals formed are separated, washed three times with a total of 21 cc. of ice-cold ethanol, and dried under reduced pressure (20 mm. Hg). 7.6 g. of 10-[4-(2,6-dimethylanilino-carbonylmethyl) - 1 - piperazinyl-methyl]dibenzo[a,d]cycloheptatriene, M.P. 160° C., are obtained.

EXAMPLE 22

10.5 g. of 10-(2-methanesulphonyloxyethyl)dibenzo [a,d]cycloheptatriene (M.P. 106–108° C.) are added to a solution of 9.45 g. of 1-methyl-2-phenyl-ethylamine in 150 cc. of anhydrous toluene, and the mixture is heated under reflux for 18 hours. After cooling, the reaction product is treated with 150 cc. of water and 20 cc. of 10 N sodium hydroxide solution. The separated aqueous solution is washed twice with a total of 150 cc. of diethyl ether. The combined organic solutions are then extracted with a total of 125 cc. of N aqueous methanesulphonic acid, washed twice with a total of 150 cc. of distilled water, and dried over anhydrous sodium sulphate. After evaporation of the solvents, the residue is suspended in 150 cc. of distilled water, treated with 20 cc. of 10 N sodium hydroxide solution, and extracted four times with a total of 140 cc. of methylene chloride. The combined methylene chloride solutions are dried over anhydrous sodium sulphate and evaporated. The residue (11 g.), dissolved in 30 cc. of boiling ethyl acetate, is treated with 4 g. of maleic acid in solution in 30 cc. of boiling ethanol. After cooling at 5° C. for two hours, the crystals formed are separated, washed three times with a total of 30 cc. of ethanol, and dried under reduced pressure (20 mm. Hg). 9 g. of 10-[2-(2-phenyl-1-methyl-ethylamino)ethyl] dibenzo[a,d]cycloheptatriene maleate, M.P. 208–210° C., are obtained.

EXAMPLE 23

To a suspension of 3.3 g. of lithium aluminum hydride in 150 cc. of anhydrous tetrahydrofuran, 7.1 g. of 10-piperazinocarbonylmethyl - dibenzo[a,d]cycloheptatriene in solution in 75 cc. of anhydrous tetrahydrofuran are added. The reaction mixture is then heated under reflux for 24 hours. After cooling on an ice bath, 3.9 cc. of distilled water, 2.9 cc. of 5 N aqueous sodium hydroxide, and 13 cc. of distilled water, are carefully added in succession. The white suspension obtained is stirred for 30 minutes at ambient temperature. The alumina is removed by filtration and washed three times with a total of 75 cc. of tetrahydrofuran and then three times with a total of 90 cc. of methylene chloride. The combined organic solutions are evaporated. The residue is dissolved in 150 cc. of diethyl ether and extracted three times with a total of 300 cc. of 2 N aqueous acetic acid. The combined acid solutions are made alkaline with 140 cc. of 5 N sodium hydroxide solution. The oil which appears is extracted three times with a total of 300 cc. of diethyl ether. The combined ethereal solutions are washed four times with a total of 200 cc. of distilled water, dried over anhydrous potassium carbonate, and evaporated. The residue (2.85 g.), dissolved in 25 cc. of boiling ethanol, is treated with 2.3 g. of fumaric acid in solution in 21 cc. of boiling ethanol. After cooling for two hours at 3° C., the crystals formed are separated, washed three times with a total of 210 cc. of diethyl ether and dried under reduced pressure (20 mm. Hg). 4.1 g. of 10-(2-piperazino-ethyl)-dibenzo[a,d]cycloheptatriene fumarate, M.P. about 210–215° C., are obtained.

10 - Piperazinocarbonylmethyl - dibenzo[a,d]cycloheptatriene (fumarate, M.P. about 205° C.) is obtained by the action of 10-imidazolocarbonylmethyl-dibenzo [a,d]cycloheptatriene on 1-formyl-piperazine in anhydrous tetrahydrofuran, followed by hydrolysis of the formyl derivative obtained with 2 N methanesulphonic acid under reflux.

EXAMPLE 24

2.0 g. of 10-(2-piperazinoethyl)dibenzo[a,d]cycloheptatriene, 1.3 g. of 2,6-dimethyl-chloracetanilide, and 1.1 g. of sodium bicarbonate are heated under reflux in 40 cc. of dimethylformamide for 3 hours. After cooling, the reaction mixture is treated with 350 cc. of distilled water, 30 cc. of 2 N sodium hydroxide solution, and 200 cc. of diethyl ether. The separated aqueous phase is washed three times with a total of 150 cc. of diethyl ether. The combined ethereal solutions are extracted four times with a total of 200 cc. of 2 N aqueous acetic acid, and then four times with a total of 200 cc. of 2 N aqueous formic acid. The combined acid solutions are made alkaline with 100 cc. of 10 N sodium hydroxide solution. The oil which separates out is extracted four times with a total of 350 cc. of methylene chloride. The combined methylene chloride solutions are dried over anhydrous potassium carbonate, and evaporated. The residue (2.15 g.) is dissolved in 9 cc. of boiling methanol. After cooling for two hours at 5° C., the crystals formed are separated, washed twice with a total of 4 cc. of ice-cold methanol, and dried under reduced pressure (20 mm. Hg). 1.3 g. of 10-[2-(4-2′,6′-dimethylanilino-carbonylmethyl - 1 - piperazinyl)ethyl]dibenzo[a,d]cycloheptatriene, M.P. 159–160° C., are obtained.

EXAMPLE 25

7.25 g. of 10 - chloromethyl-dibenzo[a,d]cycloheptatriene, 6.95 g. of 4-(N-propionylanilino)piperidine, and 3.85 g of sodium bicarbonate are heated under reflux in 120 cc. of dimethylformamide for 5 hours. After cooling, the reaction mixture is treated with 1000 cc. of distilled water, 50 cc. of 5 N sodium hydroxide solution, and 500 cc. of diethyl ether. The separated aqueous solution is washed with 250 cc. of diethyl ether. The combined ethereal solutions are washed seven times with a total of 700 cc. of distilled water, dried over anhydrous potassium carbonate, and evaporated. The residue (12.5 g.), dissolved in 55 cc. of anhydrous acetone, is treated with 6.6 cc. of an anhydrous solution of hydrogen chloride in diethyl ether (containing 4.5 mols of hydrogen chloride per litre of solution). After cooling for 4 hours at 3° C., the crystals formed are separated, washed twice with a total of 10 cc. of ice-cold anhydrous acetone, then twice with a total of 30 cc. of anhydrous diethyl ether, and dried under reduced pressure (20 mm. Hg). 9.55 g. of 10-(4-N-propionylanilino - 1 - piperidyl)-methyl-dibenzo [a,d]cycloheptatriene hydrochloride, M.P. about 190° C., are obtained.

4-(N-propionylanilino)piperidine, M.P. 92° C., is obtained by hydrogenation of 1-benzyl-4-(N-propionylanilino)piperidine in methanol at 70–80° C. under an initial hydrogen pressure of 80 bars in the presence of palladized charcoal.

1 - benzyl - 4-(N-propionylanilino)piperidine (hydrochloride, M.P. 220–224° C.) is prepared by the action of propionyl chloride on 1-benzyl-4-anilino-piperidine in acetone. 1-benzyl-4-anilinopiperidine, M.P. 88° C., is obtained by hydrogenation at normal pressure and temperature of 1-benzyl-4-phenylimino-piperidine in methanol in the presence of Adam's platinum. 1-benzyl-4-phenyliminopiperidine, M.P. 63° C., is obtained by the action of aniline on 1-benzyl-4-piperidone in benzene under reflux in the presence of acetic acid.

Proceeding as described in the foregoing examples, the following compounds may also be prepared:

10-[3-(4 - phenyl - 4-ethoxycarbonyl-1-piperidyl)propyl] dibzeno[a,d]cycloheptatriene, M.P. 121° C., by the method of Example 14;

10 - [3-(4-N-propionylanilino-1-piperidyl)propyl]dibenzo [a,d]cycloheptatriene, M.P. 144° C., by the method of Example 18;

10 - [3 - (4 - 2',6' - dimethylanilinocarbonylmethyl-1-piperazinyl)propyl]dibenzo[a,d]cycloheptatriene, M.P. 119–120° C., by the method of Example 24;

10-[2-(4 - N-propionylanilino-1-piperidyl)ethyl]dibenzo [a,d]cycloheptatriene, M.P. 130° C., the method of Example 25;

10-[3-(4-N-propionylanilino - 1-piperidyl)propyl]dibenzo [a,d]cycloheptatriene, fumarate, M.P. 156–158° C., by the method of Example 25; and 10-[3-(4-cinnamyl - 1 - piperazinyl)propyl]dibenzo[a,d] cycloheptatriene, bis - methanesulphonate, M.P. 211–213° C., by the method of Example 25.

The invention includes within its scope pharmaceutical compositions comprising one or more of the compounds of Formula I or acid addition salt or quaternary ammonium derivative thereof, in association with a significant amount of a pharmaceutical carrier (including coating). Such compositions include especially those which are suitable for oral, rectal or parenteral administration.

Solid compositions for oral administration include tablets, pills, powders and granules. In such solid compositions, the active product is mixed with one or more inert diluents, such as sucrose, lactose, or starch. These compositions may also comprise, as in normal practice, substances other than diluents, e.g., lubricants, such as magnesium stearate.

Liquid compositions for oral administration include pharmaceutically acceptable emulsions, solutions, suspensions, syrups and elixirs containing inert diluents, commonly used in the art such as water or liquid paraffin. These compositions may also comprise substances other than diluents, for example wetting agents, sweetening agents, flavorings, perfumes and preservatives.

The compositions according to the invention for parenteral administration may be aqueous or non-aqueous sterile solutions, suspensions or emulsions. As solvent or vehicle, it is possible to use propylene glycol, polyethylene glycol, vegetable oils, especially olive oil, and injectable organic esters, for example ethyl oleate. These compositions may also contain adjuvants, particularly wetting, emulsifying and dispersing agents. The sterilisation can be carried out in various ways, for example, with the aid of a bacteriological filter, by incorporating sterilising agents into the composition, by irridiation, or by heating. The compositions may also be prepared in the form of sterile solid compositions which can be dissolved, at the moment of use, in sterile water or some other sterile injectable medium.

Compositions for rectal administrations are suppositories which may contain, in addition to the active products, excipients such as cocoa butter or suppository wax.

The dose to be used depends on the therapeutic effect which is desired, the method of administration and period of treatment. Perorally, generally between 50 mg. and 200 mg. of active product per day for an adult is administered.

The following examples illustrate such compositions.

EXAMPLE 26

Using the usual technique, tablets are prepared which have the following composition:

|  | Mg. |
|---|---|
| 10-(2-dimethylaminopropyl)dibenzo[a,d] cycloheptatriene hydrochloride | 28.2 |
| Starch | 88.8 |
| Colloidal silica | 30 |
| Magnesium stearate | 3 |

EXAMPLE 27

Using the usual technique, tablets are prepared which have the following composition:

|  | Mg. |
|---|---|
| 10-(3-dimethylaminopropyl)dibenzo[a,d] cycloheptatriene hydrochloride | 28.2 |
| Starch | 88.8 |
| Colloidal silica | 30 |
| Magnesium stearate | 3 |

EXAMPLE 28

Using the usual technique, tablets are prepared which have the following composition:

|  | Mg. |
|---|---|
| 10-[2-(4-cinnamyl-1-piperazinyl)ethyl]dibenzo [a,d]cycloheptatriene bis-methanesulphonate | 43.5 |
| Starch | 78.5 |
| Colloidal silica | 25 |
| Magnesium stearate | 3 |

EXAMPLE 29

Using the usual technique, tablets are prepared which have the following composition:

|  | Mg. |
|---|---|
| 10-[4-(2,6-dimethylanilino-carbonylmethyl)-1-piperazinyl-methyl]dibenzo[a,d]cycloheptatriene | 20 |
| Starch | 92 |
| Colloidal silica | 35 |
| Magnesium stearate | 3 |

I claim:

1. A dibenzo[a,d]cycloheptatriene derivative of the formula:

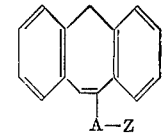

and its non-toxic acid addition salts in which A is a member selected from the group consisting of —CH$_2$—, —(CH$_2$)$_2$—, —(CH$_2$)$_3$—, —CH(CH$_3$)CH$_2$—,

—CH$_2$CH(CH$_3$)—, and —CH$_2$CH(CH$_3$)CH$_2$—, and Z is a member selected from the group consisting of dialkylamino, a radical of formula:

and a radical of formula:

in which R is a member selected from the group consisting of hydrogen, alkyl, hydroxyalkyl, phenylalkenyl, and 2,6-dimethylanilinocarbonylmethyl, R' is a member selected from the group consisting of phenyl, and N-propionylanilino, and R" is a member selected from the group consisting of hydrogen, hydroxy, and alkoxycarbonyl, each of the aforesaid alkyl, alkoxy and alkenyl group containing a maximum of 5 carbon atoms.

2. 10-(3 - dimethylaminopropyl)dibenzo[a,d]cycloheptatriene and its non-tonic acid addition salts.

3. 10 - (2 - dimethylaminoethyl)dibenzo[a,d]cycloheptatriene and its non-toxic acid addition salts.

4. 10-(3-dimethylamino-2 - methylpropyl)dibenzo[a,d]cycloheptatriene and its non-toxic acid addition salts.

5. 10-[2-(4-cinnamyl-1-piperazinyl)-ethyl]dibenzo[a,d]cycloheptatriene and its non-toxic acid addition salts.

6. 10-(4 - cinnamyl-1-piperazinylmethyl)dibenzo[a,d]cycloheptatriene and its non-toxic acid addition salts.

7. A dibenzo[a,d]cycloheptatriene derivative of the formula:

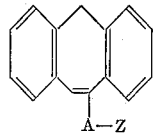

and its non-toxic acid addition salts, in which A is a saturated divalent aliphatic hydrocarbon chain of 1 to 5 carbon atoms, and Z is a member selected from the group consisting of dialkylamino, pyrrolidino, morpholino, a radical of formula:

and a radical of formula:

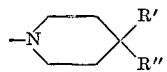

in which R is a member selected from the group consisting of hydrogen, alkyl, alkenyl, alkynyl, hydroxyalkyl, phenyl, phenylalkyl, phenylalkenyl, carbamoylalkyl, N-alkylcarbamoylalkyl, N,N - dialkylcarbamoylalkyl, N-phenylcarbamoylalkyl, N-phenyl-N-alkylcarbamoylalkyl, and N,N-diphenylcarbamoylalkyl, and R' and R" are each members selected from the group consisting of hydrogen, hydroxy, alkyl, alkoxy, alkoxycarbonyl, amino, alkylamino, dialkylamino, alkanoylamino, N-alkylalkanoylamino, N-phenylalkanoylamino, and phenyl, R" being other than hydroxy and alkoxy when R' is one of hydroxy, amino, alkylamino, dialkylamino, alkanoylamino, N-alkylalkanoylamino, and N-phenylalkanoylamino, the aforesaid phenyl groups being optionally substituted by at least one member selected from the group consisting of halogen, alkyl, alkoxy, nitro, cyano, amino, and trifluoromethyl, and each of the aforesaid alkyl, alkoxy, alkenyl, and alkanoyl radicals contains a maximum of 5 carbon atoms.

References Cited
UNITED STATES PATENTS

| 3,073,847 | 1/1963 | Doebel et al. | 260—328 |
| 3,100,207 | 8/1963 | Zirkle | 260—268 |
| 3,359,263 | 12/1967 | Van der Stelt | 260—240 |

JOHN D. RANDOLPH, Primary Examiner

U.S. Cl. X.R

260—247, 247.7, 268, 293, 294, 294.3, 326.81, 570.8, 570.9; 424—248, 250, 330